United States Patent
Chen

(10) Patent No.: US 9,525,334 B2
(45) Date of Patent: Dec. 20, 2016

(54) CONTROL CIRCUIT WITH MULTIPLE FEEDBACK LOOPS AND SWITCHING POWER SUPPLY THEREOF

(71) Applicant: Silergy Semiconductor Technology (Hangzhou) LTD, Hangzhou, ZheJiang Province (CN)

(72) Inventor: Jun Chen, Zhejiang Province (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 14/845,504

(22) Filed: Sep. 4, 2015

(65) Prior Publication Data

US 2016/0079858 A1    Mar. 17, 2016

(30) Foreign Application Priority Data

Sep. 17, 2014    (CN) .......................... 2014 1 0474470

(51) Int. Cl.
*H02M 3/155*    (2006.01)
*H02M 1/00*    (2006.01)
*H02M 3/156*    (2006.01)

(52) U.S. Cl.
CPC ....... *H02M 1/00* (2013.01); *H02M 2001/0025* (2013.01)

(58) Field of Classification Search
CPC ............. H02M 2001/0003; H02M 2001/0016; H02M 2001/0019; H02M 1/00; H02M 3/00; H02M 3/155; H02M 3/156; G05F 1/467; G05F 1/575

See application file for complete search history.

(56) References Cited

U.S. PATENT DOCUMENTS

| | | | |
|---|---|---|---|
| 5,490,055 A | 2/1996 | Boylan et al. | |
| 5,581,450 A | 12/1996 | Walne | |
| 6,052,298 A | 4/2000 | Wallace et al. | |
| 6,958,592 B2 | 10/2005 | Chapuis | |
| 2009/0140711 A1* | 6/2009 | Philbrick | H02M 3/158 323/285 |
| 2010/0270995 A1* | 10/2010 | Laur | H02M 3/156 323/285 |

* cited by examiner

*Primary Examiner* — Gary L Laxton
(74) *Attorney, Agent, or Firm* — Michael C. Stephens, Jr.

(57) ABSTRACT

A control circuit with multiple feedback loops configured for a switching power supply, can include: (i) a plurality of feedback circuits configured to receive a plurality of feedback signals of a power stage circuit, and to correspondingly generate a plurality of error signals; (ii) a plurality of switching circuits configured to transfer the error signals to a compensation circuit, where each switching circuit is correspondingly coupled to one of the feedback circuits, and where only one of the switching circuits is turned on to correspondingly transfer one of the error signals to the compensation circuit when in a steady status; (iii) the compensation circuit being configured to receive the error signals, and to generate a compensation signal; and (iv) a PWM control circuit configured to receive the compensation signal, and to generate a PWM control signal to control operation of a power switch in the power stage circuit.

8 Claims, 3 Drawing Sheets

CONTROL CIRCUIT WITH MULTIPLE FEEDBACK LOOPS AND SWITCHING POWER SUPPLY THEREOF

RELATED APPLICATIONS

This application claims the benefit of Chinese Patent Application No. 201410474470.1, filed on Sep. 17, 2014, which is incorporated herein by reference in its entirety.

FIELD OF THE INVENTION

The present disclosure generally relates to the field of power electronics, and more particularly to control circuits with multiple feedback loops, and associated switching power supplies.

BACKGROUND

A switching power supply may typically include a power stage circuit and a control circuit. The control circuit can be used to regulate on and off times of a power switch in a switch-type converter based on variations of an input voltage, various internal parameters, and a load, so as to maintain an output voltage or an output current of the switching power supply as substantially constant. Therefore, control approaches are very important to the design of a switching power supply, and may affect the performance thereof. Different power supply results may be achieved with different detection signals and/or different control circuits.

SUMMARY

In one embodiment, a control circuit with multiple feedback loops configured for a switching power supply, can include: (i) a plurality of feedback circuits configured to receive a plurality of feedback signals of a power stage circuit, and to correspondingly generate a plurality of error signals; (ii) a plurality of switching circuits configured to transfer the plurality of error signals to a compensation circuit, where each of the plurality of switching circuits is correspondingly coupled to one of the plurality of feedback circuits, and where only one of the plurality of switching circuits is turned on to correspondingly transfer one of the error signals to the compensation circuit when in a steady status; (iii) the compensation circuit being configured to receive the plurality of error signals, and to generate a compensation signal; and (iv) a pulse-width modulation (PWM) control circuit configured to receive the compensation signal, and to generate a PWM control signal to control operation of a power switch in the power stage circuit.

DETAILED DESCRIPTION

Figure 1:
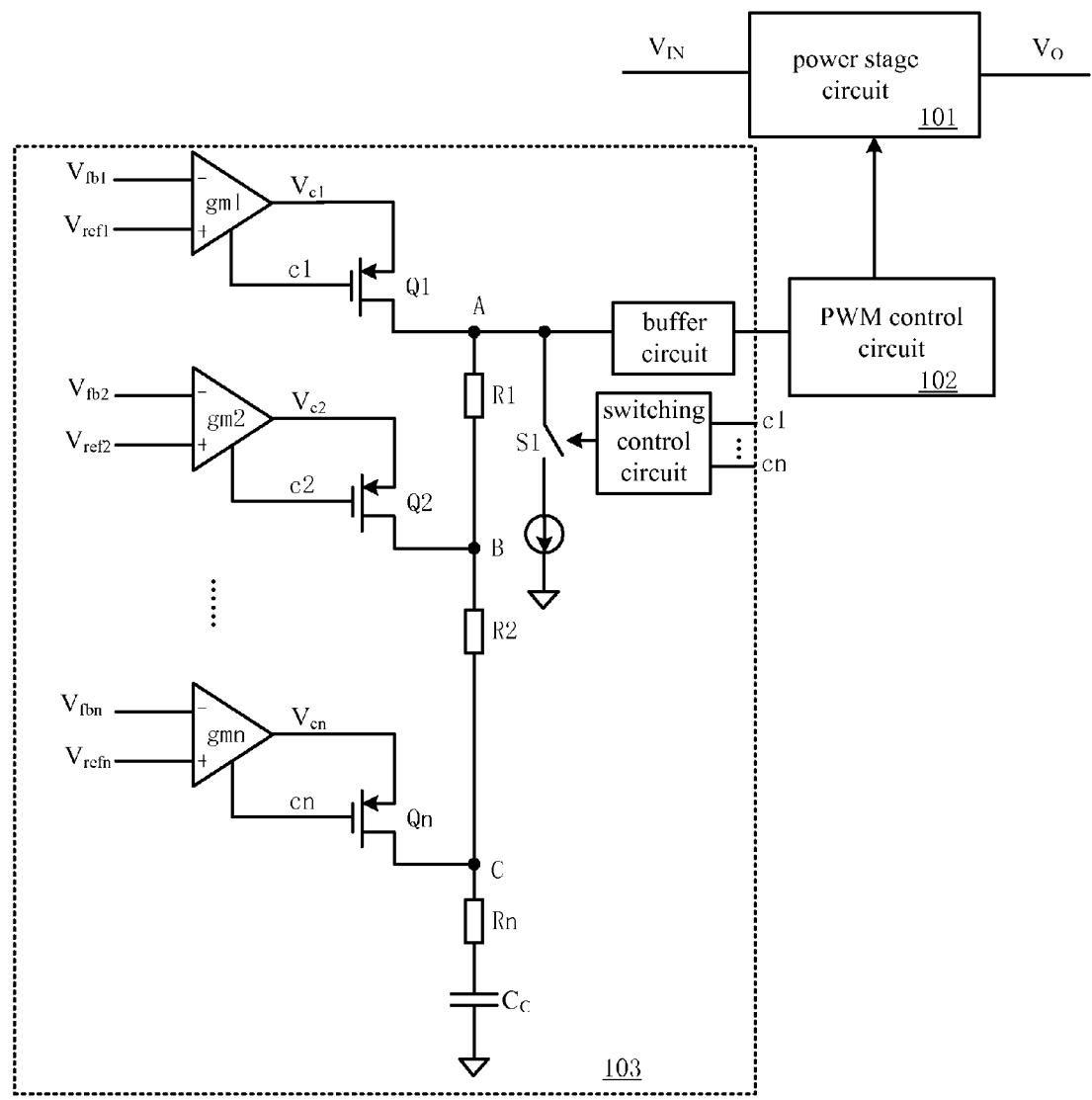
FIG. 1 is a schematic block diagram of an example control circuit with multiple feedback loops, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Switching power supplies can include multiple feedback signals that may be controlled. For example, in an application to control the charging and discharging of a battery, because feedback signals including input voltage, input current, output voltage, output current, and/or temperature may be controlled, corresponding feedback control loop circuits including compensation circuits can be configured. Each feedback control loop circuit can include an independent compensation circuit with compensation capacitors and compensation resistors to generate corresponding compensation signals. Further, one of the compensation signals may be utilized by the control circuit in order to control the system circuit.

However, because each of the compensation circuits includes independent compensation capacitors and compensation resistors, the area occupied by such compensation capacitors and resistors may be increased in comparison to other approaches. In addition, when switched to another compensation circuit, because a compensation voltage may have been stored in the compensation capacitor, a certain time interval may be needed for the regulation, which may lead to a surge of an inductor current.

In one embodiment, a control circuit with multiple feedback loops configured for a switching power supply, can include: (i) a plurality of feedback circuits configured to receive a plurality of feedback signals of a power stage circuit, and to correspondingly generate a plurality of error signals; (ii) a plurality of switching circuits configured to transfer the plurality of error signals to a compensation circuit, where each of the plurality of switching circuits is correspondingly coupled to one of the plurality of feedback circuits, and where only one of the plurality of switching circuits is turned on to correspondingly transfer one of the error signals to the compensation circuit when in a steady status; (iii) the compensation circuit being configured to receive the plurality of error signals, and to generate a compensation signal; and (iv) a pulse-width modulation (PWM) control circuit configured to receive the compensation signal, and to generate a PWM control signal to control operation of a power switch in the power stage circuit.

Referring now to FIG. 1, shown is a schematic block diagram of an example control circuit with multiple feedback loops, in accordance with embodiments of the present invention. In this particular example, a control circuit with multiple feedback loops can be applied in a switching power supply that includes power stage circuit 101 and PWM control circuit 102. Power stage circuit 101 can receive input voltage $V_{IN}$, and may generate substantially stable output voltage Vo. A power switch (e.g., power transistor) can be included in power stage circuit 101, and the power switch can be controlled by PWM control circuit 102 in order to maintain output voltage Vo as substantially constant.

In certain embodiments, control circuit 103 may also be included in the switching power supply, and may include a plurality of feedback circuits, a plurality of switching circuits, and a compensation circuit. Each of the feedback circuits can include a transconductance amplifier (e.g., transconductance amplifiers gm1, gm2, . . . gmn). An inverting input terminal of the transconductance amplifier can receive a feedback signal (e.g., feedback signals $V_{fb1}$, $V_{fb2}$, . . . $V_{fbn}$). A noninverting input terminal of the transconductance amplifier can receive a reference signal that represents an expected value of the feedback signal. For example, reference signal $V_{ref1}$, $V_{ref2}$, . . . $V_{refn}$, and an output signal can generate an error signal and a switching control signal (e.g., error signals $V_{c1}$, $V_{c2}$, . . . $V_{cn}$, and switching control signals c1, c2, . . . cn).

Figure 2:
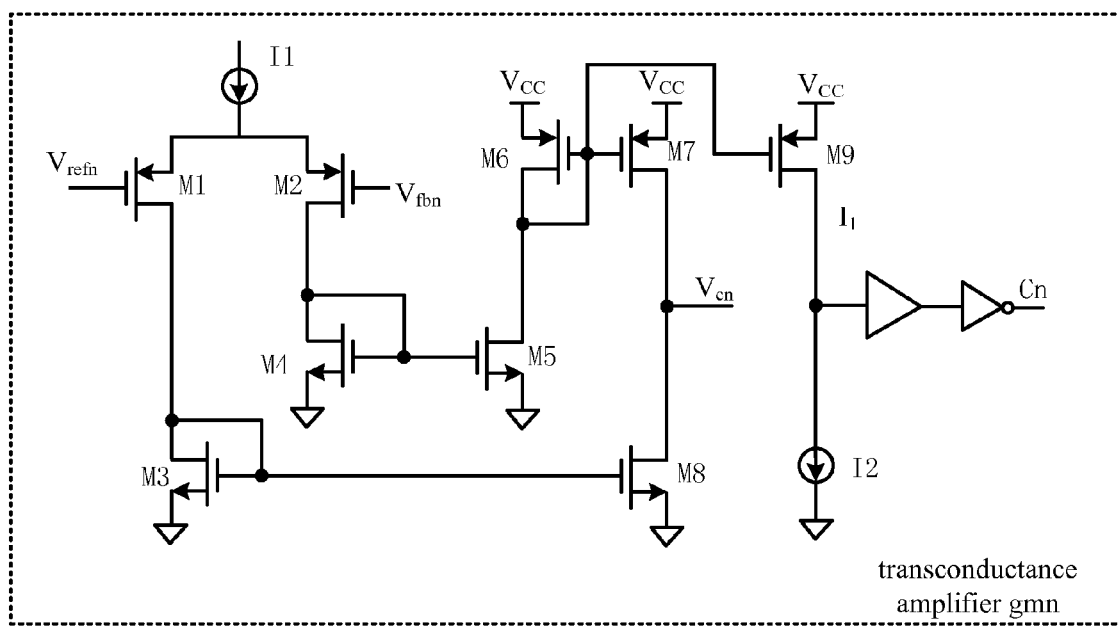
FIG. 2 is a schematic block diagram of an example transconductance amplifier, in accordance with embodiments of the present invention.

Referring now to FIG. 2, shown is a schematic block diagram of an example transconductance amplifier, in accordance with embodiments of the present invention. In this particular example, transconductance amplifier gmn can include transistors M1 and M2 in a current mirror configuration. First power terminals of transistors M1 and M2 can receive current source I1. A control terminal of transistor M1 can receive reference signal $V_{fbn}$, and a second power terminal of transistor M1 can connect to a first power terminal of transistor M3. A second power terminal of transistor M2 can connect to a first power terminal of transistor M4. Second power terminals of transistors M3 and M4 can connect to ground. A control terminal and a first power terminal of transistor M4 can connect to each other and also to a control terminal of transistor M5. A second power terminal of transistor M5 can connect to ground, and a first power terminal can connect to a second power terminal of transistor M6.

A first power terminal of transistors M6, M7, and M9 can receive voltage source $V_{CC}$. Also, control terminals of transistors M6, M7, and M9 can connect together, along with a second power terminal of transistor M6. A second power terminal of transistor M7 can connect to a first power terminal of transistor M8. A second power terminal of transistor M8 can connect to ground, and a control terminal of transistor M8 can connect to the control terminal of transistor M3. A voltage signal at a common node between transistors M7 and M8 can be configured as error signal $V_{cn}$. Also, a first power terminal of transistor M9 can receive voltage source $V_{CC}$, and current source I2 can connect between a second power terminal of transistor M9 and ground.

The value of current source I2 can be greater than about the half value of current source I1, and less than the value of current source I1. For example, the value of current source I2 can be equal about to two-thirds of that of current source I1. Also, the signal at the common node between transistor M9 and current source I2 can be configured as switching control signal "cn." Further, transistors M1, M2, . . . M9 in transconductance amplifier gmn can be N-type (NMOS) transistors. Those skilled in the art will recognize that the circuit structure and the type of the transistors may be any suitable structure and/or transistors.

Referring back to FIG. 1, each of the switching circuits can include a switch (e.g., switches Q1, Q2, . . . Qn). For example, these switches can be implemented as P-type (PMOS) transistors, and the source terminals of switches Q1, Q2, . . . Qn can be correspondingly connected to output terminals of the transconductance amplifiers. Also, the drain terminals of switches Q1, Q2, . . . Qn can connect to the compensation circuit. The gate terminals of switches Q1, Q2, . . . Qn can receive corresponding switching control signals (e.g., c1, c2, . . . cn). When a switching control signal is active, the corresponding switch can be turned on in order to transfer the corresponding error signal to the compensation circuit.

For example, the compensation circuit can include a plurality of resistors (e.g., R1, R2, . . . Rn) and capacitor $C_C$ connected in series between output terminals of the switching circuit and ground. The number of the resistors can be the same as that of the number of feedback circuits. The drain terminal of switch Q1 can connect to a first terminal of resistor R1 of the compensation circuit at node A. The drain terminals of the remaining switches can connect to the corresponding common nodes of the remaining resistors (e.g., at nodes B, C, etc.). When the system operates in a steady state, one corresponding switch can be turned on, and the corresponding error signal can be transferred to the compensation circuit. In some cases, the error signal with the minimum value can be transferred to the compensation circuit.

When the first feedback circuit operates, switch Q1 can be turned on, the compensation resistor of the compensation circuit may be equivalent to the sum of resistors R1, R2, . . . Rn, and the compensation capacitor of the compensation circuit can be capacitor $C_C$. When the second feedback circuit is in operation, switch Q2 can be turned on, the compensation resistor of the compensation circuit may be equivalent to the sum of R2 . . . Rn, and the compensation capacitor of the compensation circuit may be capacitor $C_C$. When the mth feedback circuit is in operation, corresponding switch Qm can be turned on, the compensation resistor of the compensation circuit can be equivalent to the sum of Rm . . . Rn, and the compensation capacitor of the compensation circuit can be capacitor Cc, and so forth. For example, the resistance of the resistors may be determined in accordance with the compensation signal of corresponding feedback circuit. Therefore, no independent compensation capacitor need be employed for each feedback loop, and only one compensation capacitor may be shared by a plurality of compensation loops by regulating the compensation resistors. In this way, relatively fewer components, smaller circuit volume, and substantially no surge may appear when the feedback loops are converted.

In other approaches, one independent capacitor may be employed for each of the feedback loops. Because a compensation voltage may have been stored in the compensation capacitor of the second feedback loop (e.g., about 3V), when converted to the second feedback loop from the first feedback loop, the compensation voltage may be slowly regulated to the reference voltage (e.g., about 1.5V). In addition, the compensation signal of the first feedback loop can be slowly increased to about 2.5V from the reference voltage (e.g., about 1V).

Figure 3:
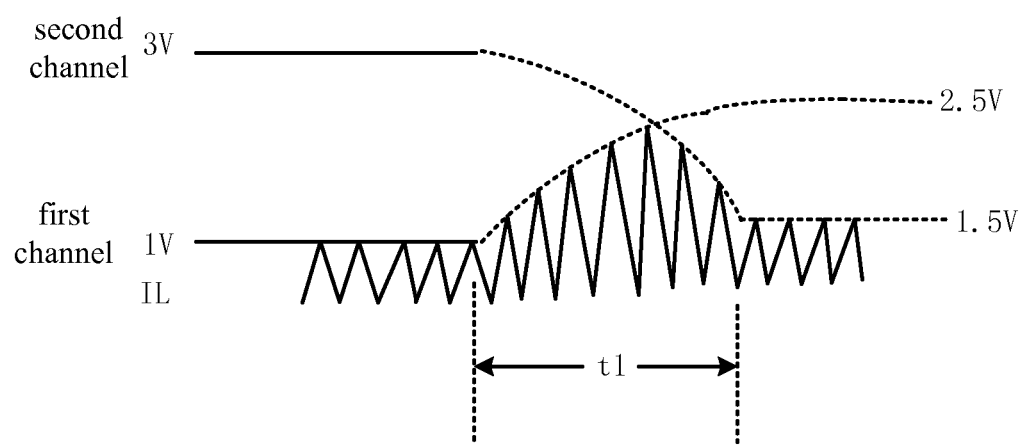
FIG. 3 is a waveform diagram of example operation indicating a current surge when multiple compensation circuits are employed.

Referring now to FIG. 3, shown is a waveform diagram of example operation indicating a current surge when multiple compensation circuits are employed. In this case, a surge of the inductor current may occur during time interval t1 when the two compensation signals are switched. Because only one compensation capacitor may be utilized in certain embodiments, when a conversion between two feedback loops occurs, there may be no such compensation voltage regulation, and thus no substantial current surge.

When one of feedback signals $V_{fbn}$ is higher than corresponding reference voltage $V_{refn}$, the current flowing through transistor M9 can be less than the current of current source I2. Also, the corresponding switching control signal cn can be low to turn on switching transistor Qn because, e.g., switching transistor Qn is a P-type transistor. When one of feedback signals $V_{fbn}$ is higher than corresponding reference voltage $V_{refn}$, corresponding error signal $V_{cn}$ can be the lowest in order to maintain the inductor current to be within a safe range to avoid potential damage to the components. In each switching period, the lowest error signal can be selected and compensated by the compensation circuit to be transferred to PWM control circuit 102.

Control circuit 103 can also include a discharging circuit including a switching control circuit, switching transistor S1, and a discharging current source. Switching transistor S1 and the current source can connect in series between the output terminal of the compensation circuit and ground. The switching control circuit can receive the switching control signals (e.g., c1 . . . cn). When all of the switching control signals (e.g., c1 . . . cn) are inactive, the switching transistors of the multichannel switching circuit may all be turned off, switching transistor S1 can be turned on, and compensation capacitor $C_C$ can be discharged by the current source.

Control circuit 103 can also include a buffer circuit that can connect between the output terminal of the compensation circuit and PWM control circuit 102. The configuration of the buffer circuit (e.g., including operational amplifiers) can be utilized to improve the driving capability of the compensation signal. In particular embodiments, the control circuit with multiple feedback loops can provide a relatively simplified circuit structure, lower costs and circuit volume, and better control performance.

Also in particular embodiments, a switching power supply can include a power stage circuit (e.g., 101) and a PWM control circuit (e.g., 102), along with control circuit 103 as described above. The power stage circuit can include a power switch, and the control circuit can be a multichannel feedback circuit. The control circuit can receive a plurality of feedback signals of the power stage circuit, and may generate a compensation signal to be transferred to PWM control circuit 102. A PWM control signal can be generated by PWM control circuit 102 based on the compensation signal, in order to control the operation of the power switch. In this way, the output signal of power stage circuit 101 can be regulated to be consistent with (e.g., substantially equal to) an expected value thereof.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit with multiple feedback loops configured for a switching power supply, the control circuit comprising:
   a) a plurality of feedback circuits configured to receive a plurality of feedback signals of a power stage circuit, and to correspondingly generate a plurality of error signals;
   b) a plurality of switching circuits configured to transfer said plurality of error signals to a compensation circuit, wherein each of said plurality of switching circuits is correspondingly coupled to one of said plurality of feedback circuits, and wherein only one of said plurality of switching circuits is turned on to correspondingly transfer one of said error signals to said compensation circuit when in a steady status;
   c) said compensation circuit being configured to receive said plurality of error signals, and to generate a compensation signal; and
   d) a pulse-width modulation (PWM) control circuit configured to receive said compensation signal, and to generate a PWM control signal to control operation of a power switch in said power stage circuit.

2. The control circuit of claim 1, wherein:
   a) said compensation circuit comprises a plurality of resistors and a capacitor coupled in series between an output terminal of a first of the plurality of switching circuits and ground; and
   b) a number of said resistors is consistent with a number of said feedback circuits.

3. The control circuit of claim 2, wherein:
   a) each of said plurality of feedback circuits comprises a transconductance amplifier;
   b) a first input terminal of said transconductance amplifier is configured to correspondingly receive one of said plurality of feedback signals;
   c) a second input terminal of said transconductance amplifier is configured to correspondingly receive a reference signal that represents an expected feedback signal value; and
   d) an output terminal of said transconductance amplifier is configured to output one of said plurality of error signals and a switching control signal.

4. The control circuit of claim 3, wherein said transconductance amplifier comprises:
   a) a first transistor configured to receive a first current source at a first power terminal, and a control terminal configured to receive said reference signal;
   b) a second transistor configured to receive said first current source at a first power terminal, and a control terminal configured to receive said feedback signal, wherein first and second transistors are configured to form a current mirror;
   c) a third transistor having a first power terminal coupled to a second power terminal of said first transistor, and a second power terminal coupled to ground;
   d) a fourth transistor having a first power terminal coupled to a second power terminal, and a second power terminal coupled to ground;
   e) a fifth transistor having a control terminal coupled to a control terminal and said first power terminal of said fourth transistor, and a second power terminal coupled to ground;
   f) a sixth transistor having a first power terminal configured to receive a voltage source, a second power terminal coupled to a first power terminal of said fifth transistor, and a control terminal coupled to said second power terminal of said sixth transistor;
   g) a seventh transistor having a first power terminal configured to receive said voltage source, and a control terminal coupled to said control terminal of said sixth transistor;
   h) an eighth transistor having a first power terminal coupled to a second power terminal of said seventh transistor, a second power terminal coupled to ground, and a control terminal coupled to said control terminal of said third transistor, wherein a signal at a common node between said seventh and eighth transistors is configured as said error signal; and
   i) a ninth transistor having a first power terminal configured to receive said voltage source, and a second power terminal coupled to ground through a second current source, wherein a signal at a common node between said ninth transistor and said second current source is configured as said switching control signal.

5. The control circuit of claim 3, wherein each of said plurality of switching circuits comprises:
   a) a switching transistor having a first power terminal coupled to said output terminal of said transconductance amplifier, a second power terminal coupled to said compensation circuit, and a control terminal configured to receive said switching control signal; and
   b) wherein said switching transistor is turned on and said error signal is transferred to said compensation circuit when said switching control signal is active.

6. The control circuit of claim 5, wherein:
   a) said second power terminal of said switching transistor of a first of said plurality of switching circuits is coupled to a first terminal of a first resistor of said compensation circuit; and
   b) each of said second power terminals of remaining switching transistors is correspondingly coupled to one common node of remaining resistors.

7. The control circuit of claim 5, wherein said control circuit further comprises a discharging circuit coupled between ground and a common node between said compensation circuit and said PWM control circuit.

8. The control circuit of claim 1, wherein said control circuit further comprises a buffer circuit coupled between said compensation circuit and said PWM control circuit.

* * * * *